Figure 1:
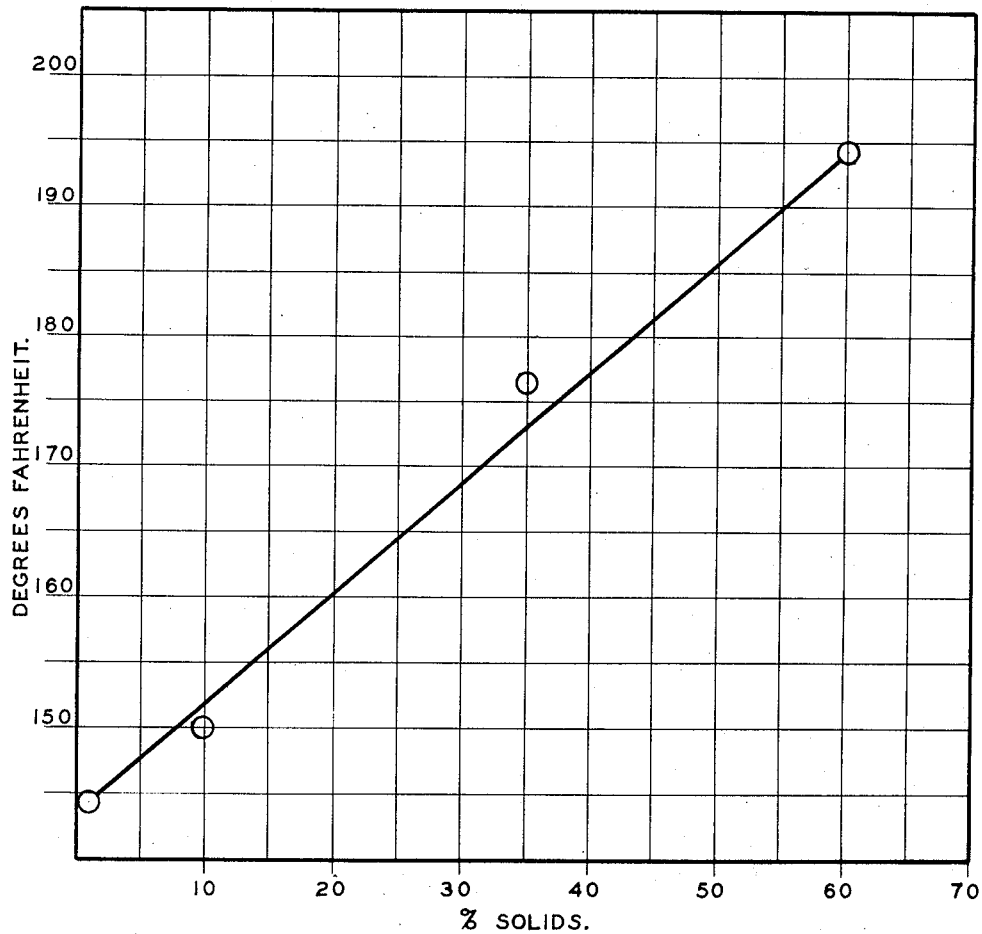

Dec. 15, 1953 J. B. BATDORF 2,662,881
PROCESS FOR THE PURIFICATION OF WATER-SOLUBLE REACTION
PRODUCTS OF A ROSIN AND AN ALKYLENE OXIDE
Filed Nov. 29, 1951 2 Sheets-Sheet 1

CLOUD POINTS OF 15-MOL ETHYLENE OXIDE
ADDUCT OF N WOOD ROSIN.

JACK B. BATDORF,
INVENTOR.

BY Ernest G. Peterson
AGENT.

CLOUD POINT VS E.O. MOLE LENGTH
OF ROSIN TYPE ADDUCTS.

LEGEND:-
○ N WOOD ROSIN.
△ HYDROGENATED ROSIN.

Patented Dec. 15, 1953

2,662,881

UNITED STATES PATENT OFFICE 2,662,881

PROCESS FOR THE PURIFICATION OF WATER-SOLUBLE REACTION PRODUCTS OF A ROSIN AND AN ALKYLENE OXIDE

Jack B. Batdorf, Wilmington, Del., assignor to Hercules Powder Company, Wilmington, Del., a corporation of Delaware Application November 29, 1951, Serial No. 258,941

5 Claims. (Cl. 260—100)

This invention relates to purifying water-soluble reaction products of a rosin acid-containing material and an alkylene oxide.

The products to which the process of the invention is applicable are obtained by reacting an alkylene oxide with a rosin acid-containing material in the proportions of at least ten mols of the former to one mol of rosin acid, as set forth, for example, in U. S. 2,469,493 and in British Patent 467,571.

When ethylene oxide is used as the alkylene oxide, I have discovered that the reaction product obtained contains not only the monoesters of polyoxyethylene glycols of the general formula:

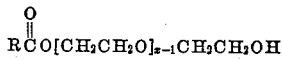

but also appreciable quantities of the diesters of polyoxyethylene glycols of the general formula:

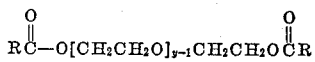

and large amounts of unesterified polyoxyethylene glycols of the general formula:

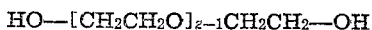

where R is the nucleus of a rosin acid and $x$, $y$ and $z$ are integers. Each reaction product contains a series of compounds conforming to each of the above general formulae. In any particular reaction product the ranges of values for $x$, $y$ and $z$ are not necessarily the same.

It is convenient to refer to the reaction products to which this invention is applicable by the number of mols of alkylene oxide per mol of rosin acid employed in the preparation thereof. Thus, the reaction product of 15 mols of alkylene oxide per mol of rosin acid is referred to as the 15-mol product, the reaction product of 10 mols of alkylene oxide with 1 mol of rosin acid as the 10-mol product, etc. In the case of the 15-mol product, as an example, it will contain substantial amounts of the monoester containing 15 ethenoxy groups per molecule but it will also contain substantial amounts of products containing a lesser number of ethenoxy groups and products containing a higher number of ethenoxy groups. Similarly, the 15-mol product will contain diesters having 15 ethenoxy groups per molecule along with products containing a lesser number of ethenoxy groups and products containing a higher number of ethenoxy groups. The polyoxyalkylene glycols present in the 15-mol product will comprise the compound having 15 ethenoxy groups as well as the higher and lower molecular weight glycols.

The term "reaction product" used hereinafter refers to the mixture obtained as the result of reacting an alkylene oxide with a rosin acid-containing material and includes a mixture of polyoxyalkylene glycols together with monoesters of polyoxyalkylene glycols and diesters of polyoxyalkylene glycols and any catalyst used to promote the reaction.

These esters of polyoxyalkylene glycol are oily to wax-like water-soluble materials useful as emulsifying, wetting, and detergent agents. While any of the lower aliphatic alkylene oxides may be used in preparing these esters, ethylene oxide is preferred and the invention will henceforth be discussed in terms of ethylene oxide alone. However, it is understood that the corresponding condensation products with other alkylene oxides such as 1,2-propylene oxide, 1,2-butylene oxide and the like, or mixtures of the same with each other or ethylene oxide, may be used in carrying out the process of the invention described infra.

I have further discovered that the presence of polyoxyethylene glycols in the reaction products is undesirable for a number of reasons. Thus, these products are used as emulsifiers for emulsion-oil paints. However, the polyoxyethylene glycols hinder the drying of the oils and thus are definitely undesirable ingredients of the emulsifying agent. Also, in any use where aliphatic hydrocarbon solubility is desirable, such as insecticide emulsifiers, performance is improved by removal of the polyoxyethylene glycols.

The need for separating the polyoxyethylene glycols is particularly acute in the case of the rosin acid-ethylene oxide condensates. In the case of such condensates, the reaction product contains as much as about 20% of polyoxyethylene glycols. On the other hand, ethylene oxide condensates of a substituted phenol such as nonylphenol contain such minor amounts of polyoxyethylene glycols that they are of no practical consequence.

Another objectionable component of the reaction product is the catalyst used to promote the condensation of the ethylene oxide and the rosin acid material. When an insoluble surface-active substance, such as activated charcoal, is used as the catalyst or clarifying agent, it may be removed by filtration as shown in U. S. 2,496,582, to Charles Enyeart. When an electrolyte such as an alkali alcoholate, an alkali metal hydroxide, an alkaline earth metal hydroxide, sulfuric acid, etc., is used as the catalyst, it becomes much more difficult to remove the catalyst because of the high water solubility of such catalysts. The removal of certain of the anionic materials introduced as catalysts is an especially important consideration when these reaction products are to be used with cationic detergents to produce disinfectant-type detergents. Where such uses are contemplated, catalysts such as alkali resinates, alkali methylates, and other materials which have oil-soluble anions that will react with cationic detergents causing precipitation of the cationic detergent in aqueous media must be removed.

Now it has been discovered that by making use of a highly unusual property an easy and highly efficient separation of the ester and diester of polyoxyethylene glycol from the polyethylene glycols and water-soluble catalyst may be effected. The separation is effected by simply heating an aqueous solution of the reaction product above the lower consolute temperature of the mixture. On passing the lower consolute temperature, the mixture separates into two phases—an upper phase containing water, polyoxyethylene glycols, and water-soluble catalyst and the lower phase containing the ethylene oxide adduct. The two phases may then be separated by any of the means known to the art. In view of the chemical similarity in the molecular structures of the polyoxyethylene glycols and their esters, it is highly unusual and unexpected that they also do not possess a lower consulate temperature. However, it has now been found that highly efficient separations of the polyoxyethylene glycols from their esters may be achieved by means of the process herein set forth.

The following examples are presented in illustration but not in limitation of the invention. All parts are by weight unless otherwise specified.

Example 1

An addition product was prepared by reacting a commercial grade of dehydrogenated rosin and ethylene oxide in the proportion of 15 mols of ethylene oxide per mol of dehydrogenated rosin acid. The dehydrogenated rosin employed contained 9.5% neutral bodies, the remainder being acid constituents. It was prepared by heating N wood rosin in the presence of a palladium catalyst and in the absence of added substances capable of reducing the unsaturation of the rosin.

A 15% aqueous solution of this adduct was heated to 100° C. The solution separated into two phases, a clear amber layer on the bottom and a slightly milky layer above. The lower layer containing the ethylene oxide adduct of dehydrogenated rosin was withdrawn and found to contain 55% solids consisting in all of 85% of the original sample. The upper layer containing the polyoxyethylene glycols and catalyst was dehydrated and found to contain 15% of the original sample. The detergency of the polyoxyethylene glycol-free ethylene oxide adduct was found to be 86% as determined by a standard detergency test described infra. The detergency of the polyoxyethylene glycol fraction was found to be 38% as determined by the same detergency test. The detergency of water without any additives was found to be 20% by the same detergency test.

Example 2

Example 1 was repeated using a 15-mol ethylene oxide adduct of N wood rosin in place of the 15-mol ethylene oxide adduct of the dehydrogenated rosin which was used in Example 1. The polyoxyethylene glycol fraction was found to be 17% of the weight of the original sample. The N wood rosin employed contained 89.2% rosin acids and 10.8% neutral bodies. The detergencies of the polyoxyethylene glycol-free ethylene oxide adduct fraction and of the polyoxyethylene glycol fraction were each found to be of the same order as in Example 1.

Example 3

Lower consolute temperature determinations were run on 13-, 15-, 17-, and 20-mol ethylene oxide adducts of the N wood rosin described in Example 2, and on 15.5-, 20.5-, and 30-mol ethylene oxide adducts of a commercial grade of hydrogenated rosin. The hydrogenated rosin employed contained 12.3% neutral bodies, the remainder being acid constituents. It was prepared by heating N wood rosin under pressure in the presence of hydrogen and Raney nickel catalyst until it was about 45% saturated with hydrogen. All determinations were made on a 1% aqueous solution of adduct. The results obtained are set forth in Fig. 2. In Fig. 1 is plotted the variation of lower consolute temperature (cloud point) with concentration for a 15-mol ethylene oxide adduct of the N wood rosin described in Example 2.

Example 4

A sample of a 15-mol adduct of the N wood rosin described in Example 2 was divided into two lots. One lot was used as a blank while the other was subjected to three extractions using a 15% aqueous solution and heating up to 100° C. as described in Example 1. In all, polyoxyethylene glycols amounting to 23% of the weight of the initial sample were removed by the series of extractions. The detergencies of the extracted sample and of the unextracted sample were now determined and found to be 122% and 95%, respectively.

Systems possessing lower consolute temperatures are highly unusual but not unknown. The phenomenon is attributable to compound formation between the two components of the system by means of a hydrogen bridge. In the instant case, a hydrate of the ethylene oxide adduct is formed. Therefore, it is essential to have enough water present in the system to form the hydrate plus an excess to constitute the aqueous layer containing the polyoxyethylene glycols and catalyst. Thus, a dilution of at least about 1.5 parts of water to 1 part of reaction product is needed. It is preferred to have a dilution of at least about 5 parts of water to 1 part of reaction product. The separation is better as larger water:product ratios are used, up to about 100:1. The quality of separation is also improved by repeating the separation process. After about three separations no appreciable improvement results from further repetition of the process. The first separation removes by far the major part of the polyoxyethylene glycols so that only one separation is sufficient for most purposes.

Figure 2:
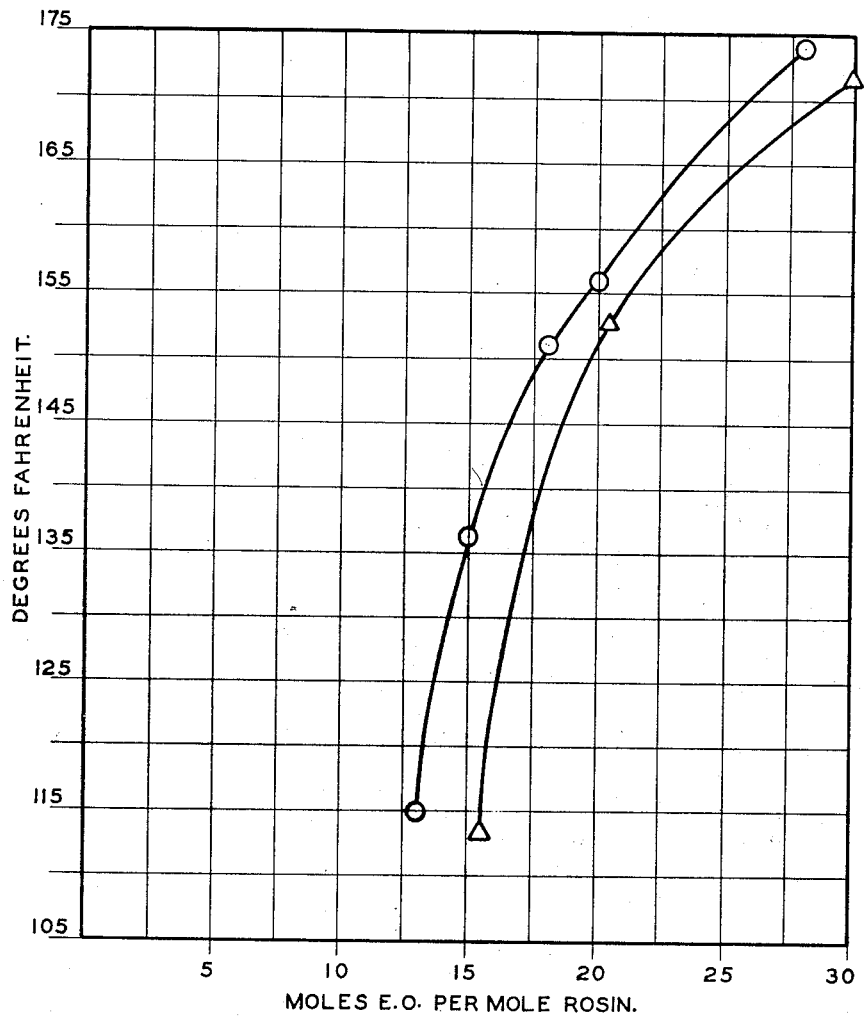

The lower consolute temperature varies with the nature of the rosin acid-containing material used in making the adduct as well as with the mol length of the adduct as shown in Fig. 2. Modification of the rosin nucleus, however, does not appear to have too great an effect on the lower consolute temperature. Hence, in general, it may be said that the lower consolute temperature is about 140° F. or higher for about 5% or higher concentrations of the adducts in aqueous solution. As indicated in Fig. 1, the lower consolute temperature also varies with the concentration of the adduct in aqueous solution. It will be appreciated that any temperature from the lower consolute temperature of the particular system under consideration up to the upper consolute temperature of the system may be used in making the separation of this invention. It is preferred, however, to use a temperature between the lower consolute temperature and the boiling point of the system at atmospheric pressure.

The rosin acid-containing material employed in accordance with this invention may be any of the various grades of wood or gum rosin or any of the modified rosins wherein the hydrocarbon nuclei of the rosin acids contained therein have been modified in some way as, for example, by hydrogenation, dehydrogenation, disproportion, polymerization, heat treatment, acid isomerization, etc. Thus, for example, hydrogenated rosin, dehydrogenated rosin, disproportionated rosin, polymerized rosin, heat-treated rosin, acid isomerized rosin, etc., may be employed. Any of the aforesaid rosins may be subjected to one or more refining treatments as, for example, treatment to remove visual or latent color bodies, treatment to remove neutral bodies, etc., prior to use in accordance with this invention. Such refining treatments may be, in the case of the modified rosins, employed prior to modification or thereafter. It is well known, too, that the rosin acid fraction contained in wood or gum rosin is a mixture of isomerization compounds which include abietic, l-pimaric, d-pimaric, sapinic, etc., acids. Such specific compounds may be employed equivalently with the naturally occurring mixtures found in wood or gum rosin, if desired; however, from an economical standpoint the naturally occurring wood or gum rosin or the aforesaid modified forms thereof are preferred. Resin acids from tall oil or tall oil itself may be used, if desired.

As stated previously, modified rosins may be employed in accordance with this invention. Hydrogenated rosin may be made by any of the known procedures as, for example, those disclosed in U. S. 2,094,117 and U. S. 2,155,036. Similarly, any of the prior art procedures for making disproportionated rosin may be employed, that of U. S. 2,154,629 being exemplary. Disproportionated rosin is a rosin that has been treated with an active hydrogenation catalyst under conditions of reaction adapted to produce an intra- and inter-molecular rearrangement of the hydrogen atoms in the rosin acids contained therein and in the absence of added substances capable of reducing the unsaturation of the rosin under the conditions of treatment, the product being characterized in that it has a lesser degree of unsaturation than the rosin from which it was formed. Dehydrogenated rosins, i. e., those rosins which have been modified such that they contain a substantial amount of dehydroabietic acid may be employed in accordance with this invention. Disproportionated rosins contain substantial amounts of dehydroabietic acid as do certain heat-treated rosins, pyroabietic acid, etc. Polymerized rosin may be prepared by any of the procedures known to the art to effect polymerization as, for example, by the process of U. S. 2,017,866. The prior art is replete with procedures for modifying rosin by heat treatment to effect isomerization of the rosin acids contained therein. Any such heat-treated rosins may be employed in accordance with this invention. Similarly, rosins which have been treated with acid isomerization agents to effect isomerization of the acids contained therein may be employed. Any of the aforesaid modified rosins may be condensed with ethylene oxide to yield the reaction products which are treated in accordance with this invention.

For the detergency test referred to in the examples, uniformly soiled white cotton fabrics were used. The tests were made in hard water (300 p. p. m. of calcium and magnesium, calculated as calcium carbonate) at 110° F. All of the products were tested at 0.06% by weight of active detergent against a standard detergent having the formula $C_{17}H_{33}CON(CH_3)C_2H_4SO_3Na$ at a concentration of active detergent of 0.1% by weight. Reflectance of the washed fabrics was measured using a Hunter reflectometer which was set to read 100 on magnesium oxide white. By dividing the reflectance values so obtained for a product by the reflectance value obtained in the case of the fabric washed with the control and multiplying by 100, a value (per cent detergency) was obtained for each product which indicated its effectiveness as a detergent compared with the control.

The standard detergent was used in the form of a neutral built detergent consisting of 35% N-(9-octadecenoyl)-N-methyl taurate as the active ingredient and 65% sodium sulfate. The ethylene oxide adducts were tested as alkaline built detergents containing 18% ethylene oxide adduct and 2% of a detergent consisting of an alkyl benzene sodium sulfonate marketed by the Atlantic Refining Company under the trade name of "Ultrawet K," thus giving a total of 20% active ingredient. The other components of the detergent were 2% of a carboxymethylcellulose having a degree of substitution of 0.7 carboxymethyl group per anhydroglucose unit, 5% sodium silicate having the approximate formula $$Na_2SiO_3.5H_2O$$

50% sodium tripolyphosphate and 23% sodium sulfate.

The present invention yields products which are neutral in nature and contain substantially no diluent such as polyoxyethylene glycols or anionic material introduced as catalyst. As a result the compounds which have been purified by the instant process have improved emulsifying and detergent properties, give considerably improved performance in any use where aliphatic hydrocarbon solubility is desired, such as in insecticide emulsifiers, and when used as an emulsifier for an emulsion paint do not hinder the drying of the oils of the paint. Furthermore, the neutral detergents obtained by this process are easily blended with cationic detergents to produce disinfectant-type detergents.

What I claim and desire to protect by Letters Patent is:

1. The process for removing polyoxyalkylene glycols from a water-soluble product comprising polyoxyalkylene glycols and polyoxyalkylene glycol esters formed by the reaction of an 1,2-alkylene oxide with a rosin acid-containing material in the proportion of at least ten mols of the former to one mol of said rosin acid-containing material, said rosin acid-containing material having rosin acid as the sole reactive ingredient, which comprises adding water to the said product to form an aqueous solution, heating the said solution to above the lower consolute temperature of the said solution, said temperature being below the upper consolute temperature if any, maintaining the said solution at the said temperature until the said solution separates into two phases, and separating the two phases.

2. A process according to claim 1 wherein the rosin acid-containing material is rosin.

3. A process according to claim 1 wherein the alkylene oxide is ethylene oxide.

4. A process according to claim 3 wherein the rosin acid-containing material is hydrogenated rosin.

5. A process according to claim 3 wherein the rosin acid-containing material is dehydrogenated rosin.

JACK B. BATDORF.

No references cited.